United States Patent [19]

Schimmel et al.

[11] Patent Number: 5,780,763

[45] Date of Patent: Jul. 14, 1998

[54] FRACTURE/SEVERANCE OF MATERIALS

[75] Inventors: Morry L. Schimmel, deceased, late of St. Louis, Mo., by Fern R. Schimmel, executor; Laurence J. Bement, Newport News, Va.; Glenn F. DuBrucq, Jr., Fenton; Edward A. Klein, St. Charles, both of Mo.

[73] Assignee: The United States of America as represented by the Administrator of the National Aeronautics and Space Administration, Washington, D.C.

[21] Appl. No.: 416,597

[22] Filed: Apr. 4, 1995

[51] Int. Cl.$^6$ ............................................. F42D 3/00
[52] U.S. Cl. ..................... 102/302; 102/303; 102/275.8
[58] Field of Search ........................... 102/302, 303, 102/275.8

[56] References Cited

U.S. PATENT DOCUMENTS

| | | | |
|---|---|---|---|
| 3,491,847 | 1/1970 | Abbott | 102/303 |
| 4,488,486 | 12/1984 | Betts | 102/275.8 |
| 5,524,546 | 6/1996 | Rozner et al. | 102/302 X |
| 5,650,588 | 7/1997 | Nakajima | 102/302 X |

*Primary Examiner*—Peter A. Nelson

[57] ABSTRACT

A method for severing or weakening materials. Explosive cords are placed in grooves on the upper surface of the material to be severed or weakened. The explosive cords are initiated simultaneously to introduce explosive shock waves into the material. These shock waves progress toward the centerline between the explosive cords and the lower surface of the material. Intersecting and reflected waves produce a rarefaction zone on the centerline to fail the material in tension. A groove may also be cut in the lower surface of the material to aid in severing or weakening the material.

4 Claims, 5 Drawing Sheets

FRACTURE/SEVERANCE OF MATERIALS

ORIGIN OF THE INVENTION

The invention described herein was made jointly made by a contract employee during the performance of work under a NASA contract which is subject to the provisions of Public Law 95-517 (35 USC 202) in which the contractor has elected not to retain title, by an employees of the United States Government, and employees of McDonnell Douglas Corporation during the performance of work under a Memorandum of Agreement.

BACKGROUND OF THE INVENTION

1. Technical Field of the Invention

The present invention relates generally to severing materials, and more particularly to severing or weakening materials through explosively induced, augmented shock waves.

2. Discussion of the Related Art

Explosive severance of materials frequently requires heavy, complex approaches. In aerospace systems, these approaches are susceptible to environmental and physical damage.

Commonly used separation systems, utilizing linear explosives are shown in FIGS. 1–7. FIG. 1 shows a mild detonating cord (MDC) 10 having a metal sheath 12 and an explosive core 14. FIG. 2a shows an MDC 10 within a break structure 16. Upon explosion, the MDC 10 produces an omnidirectional, several million psi pulse that ruptures the break structure 16 as shown in FIG. 2b. The structure surrounding the MDC directs the energy. FIG. 3a shows two MDC's 10 installed on either side of a break bolt 18. Firing either of the two MDC's 10 fails the predrilled bolt 18 in tension. Again the surrounding structure provides directionality. In FIG. 4a, the MDC 10 is contained within a steel tube 20, which contains the explosive products during expansion to fail the structure at notch 22. The major disadvantage of the MDC methods is that large containment structures are required.

FIG. 5 shows flexible linear shaped charge (FLSC) having a metal sheath 26 and an explosive core 24, which has a directional output, focusing a high-velocity fragment jet into the structure to be severed. The application shown in FIG. 6 is the system used to release the F-111 crew module which consists of severing plates (splice plates) 36 that attach the module 38 to the aircraft fuselage 34. The holder 28 contains the FLSC 32 to maintain its position and provide the necessary separation from the target structure. The FLSC 32 is encapsulated by shrink tubing to prevent contamination in the chevron, which reduces fragment generation an cutting ability. Panel severance is also currently accomplished in the F-111 aircraft by using FLSC. Disadvantages of this method are that panels severed with FLSC and explosive cord produce debris through the material on severing, which could harm personnel or equipment on functioning and that the installation and maintainability of the FLSC explosive assembly is costly and its service life is limited.

FIG. 7 shows a structure that is failed at the notches 40 in the two doubler plates 42 by explosively expanded tubes 44, again without release of explosive products. This method is the Super*Zip approach and its disadvantage is that it is very complex, heavy and voluminous.

The present method used for severing canopy materials to allow through-canopy crew ejection, such as on the AV-8 (Harrier) and T-45 (Navy trainer), consists of mounting a single explosive detonating cord on the inboard surface of the canopy. The mounting assembly, a rubber extrusion, encompasses the cord and is used to protect crewmembers from high-velocity fragments form the detonating cord on functioning. Disadvantages of this method are that the crewmembers are exposed to potentially harmful products from the inboard mounted severing assembly, including high-intensity sound and impacts by high-velocity fragments from the detonating cord and mounting assembly, the pilot's vision is obstructed by the mounting assemblies described above, the thickness and type of transparency materials that can be severed is very limited and the installation and maintainability of the explosive assembly is costly and its service life is limited . Due to these disadvantages, the quantity of explosive that can be used is limited, which results in a capability of severing only small thicknesses (<0.4-inch) of stretched or fracture-sensitive cast acrylic.

Commonly used separation systems for vehicle staging and payload release utilizing linear explosives include MDC, FLSC and the Super*Zip approach, which are discussed above. Stages and payloads are also released by a mechanism called a Marman band, which is a pyrotechnically released hoop that is contoured to restrain the circumferentially protruding two halves of a structural interface within the hoop. The separation joints used in this method are very heavy, requiring high-strength cylinder structures to support the loads induced by the hoop.

Other prior art which utilizes explosive input to achieve material severance/weakening are: Burkdoll, U.S. Pat. No. 3,277,766, Explosively Releasable Bolt; and Schimmel, et al, U.S. Pat. No. 4,301,707, Embedded Explosive Severance of Non-Metallic Materials. Both of these patents use a single explosive charge, and the resulting incident and reflected shock waves to accomplish severance.

It is accordingly an object of the present invention to provide a severance/weakening method which severs materials which cannot be fractured with existing methods.

It is an object of the present invention to provide a severance/weakening method which severs thicknesses which cannot be fractured with existing methods.

It is another object of the present invention to provide a severance/weakening method which minimizes weight, volume and complexity.

It is another object of the present invention to provide a severance/weakening method which controls the direction of explosive debris on functioning.

It is another object of the present invention to provide a severance/weakening method with improved durability.

It is yet another object of the present invention to accomplish the foregoing objects in a simple manner.

Additional objects and advantages of the present invention are apparent from the drawings and specification which follow.

SUMMARY OF THE INVENTION

According to the present invention the foregoing and additional objects are obtained by providing a method for severing a material. On the upper surface of the material parallel grooves are cut equidistant from the desired severance site and an explosive cord is placed in each of the two grooves. The explosive cords are initiated simultaneously to introduce explosive shock waves into the material. These shock waves progress toward the centerline between the explosive cords and the lower surface of the material.

Intersecting and reflected waves produce a rarefaction zone on the centerline to fail the material in tension. A groove may also be cut in the lower surface of the material to aid in severing the material. This method may also be used to weaken a material.

DETAILED DESCRIPTION OF THE INVENTION

Figure 1:
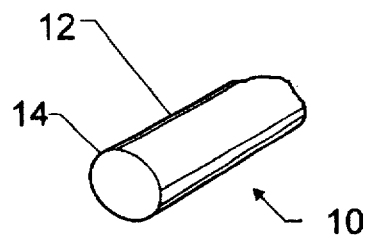
FIG. 1 is a perspective view showing a mild detonating cord (MDC) as used in the prior art and in the present.
Figure 2A:
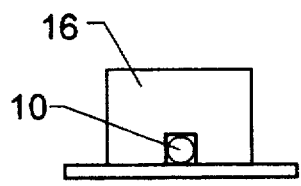
FIG. 2a is a cross sectional view of a prior art severance method before detonation of the explosive elements.
Figure 3A:
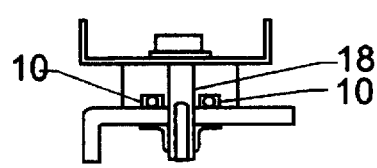
FIG. 3a is a cross sectional view of a prior art severance method before detonation of the explosive elements.
Figure 4A:
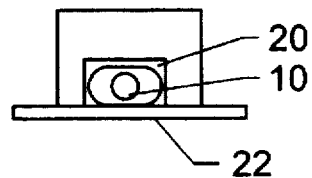
FIG. 4a is a cross sectional view of a prior art severance method before detonation of the explosive elements.
Figure 2B:
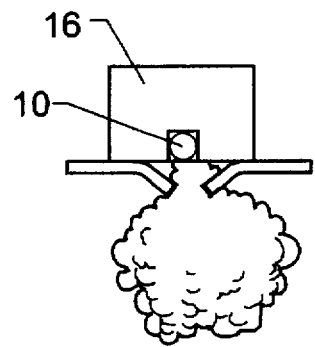
FIG. 2b is a cross sectional view of a prior art severance method after detonation of the explosive elements.
Figure 3B:
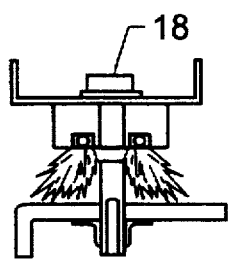
FIG. 3b is a cross sectional view of a prior art severance method after detonation of the explosive elements.
Figure 4B:
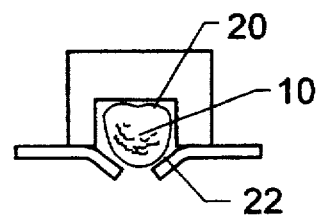
FIG. 4b is a cross sectional view of a prior art severance method after detonation of the explosive elements.
Figure 5:
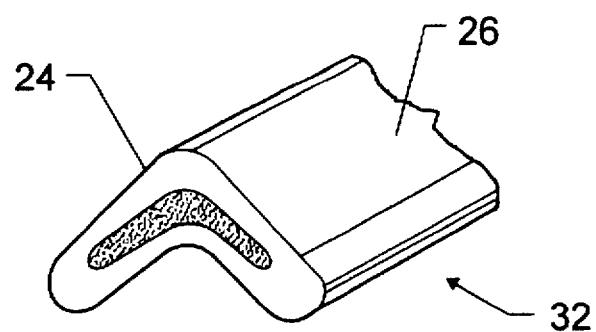
FIG. 5 is a perspective view of a flexible linear shaped charge (FLSC)
Figure 6:
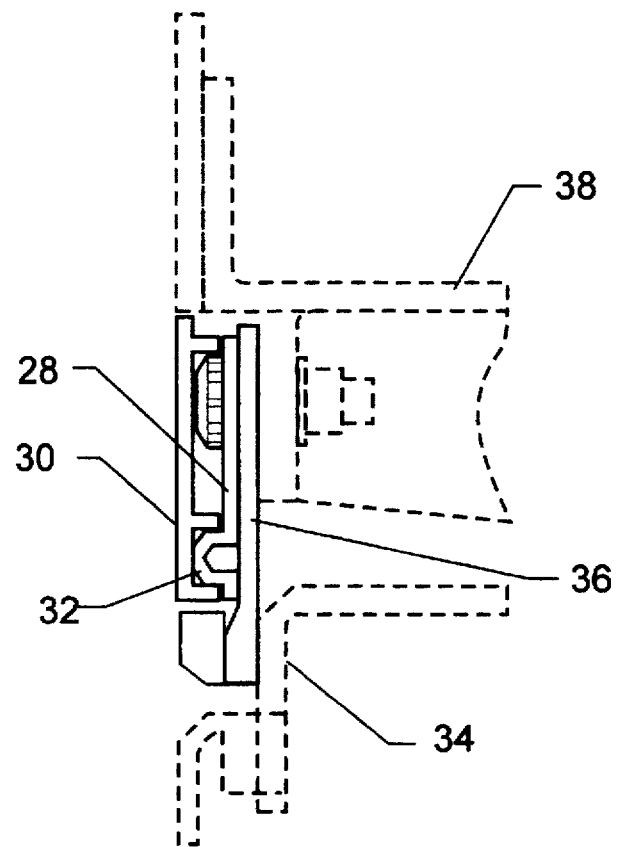
FIG. 6 is a cross sectional view of a prior art severance method before detonation of the explosive elements.
Figure 7:
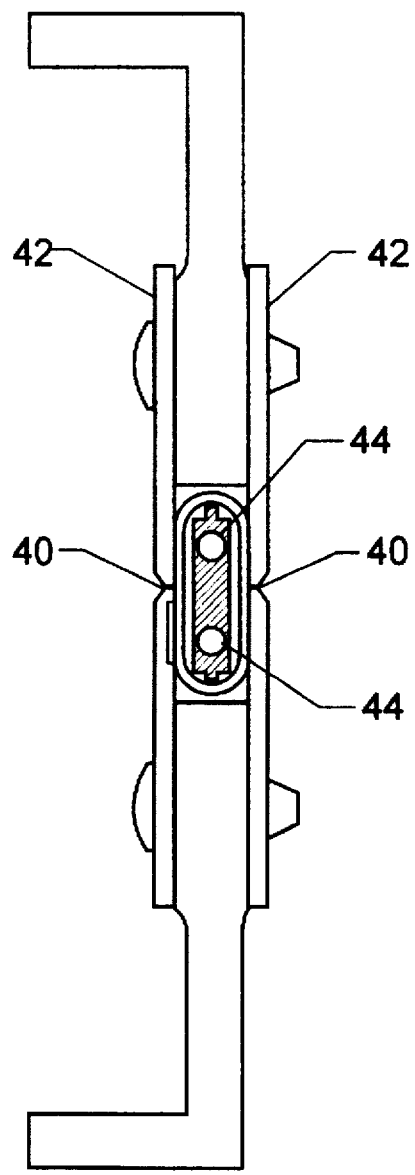
FIG. 7 is a cross sectional view of a prior art severance method before detonation of the explosive elements.
Figure 8:
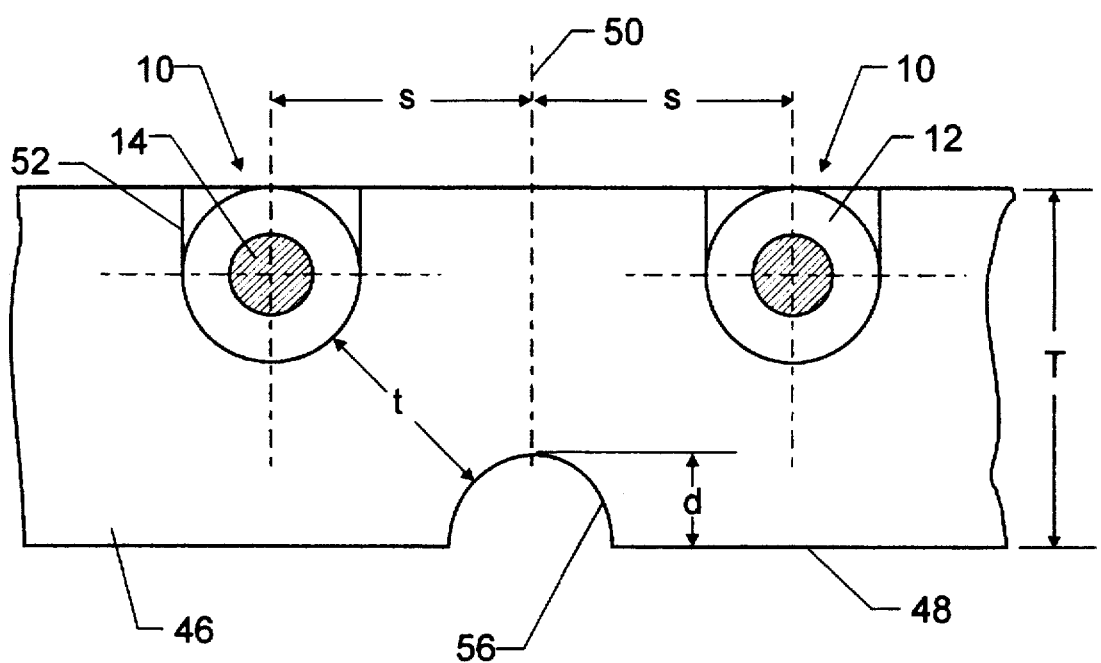
FIG. 8 is a cross sectional view of the present invention.
Figure 9:
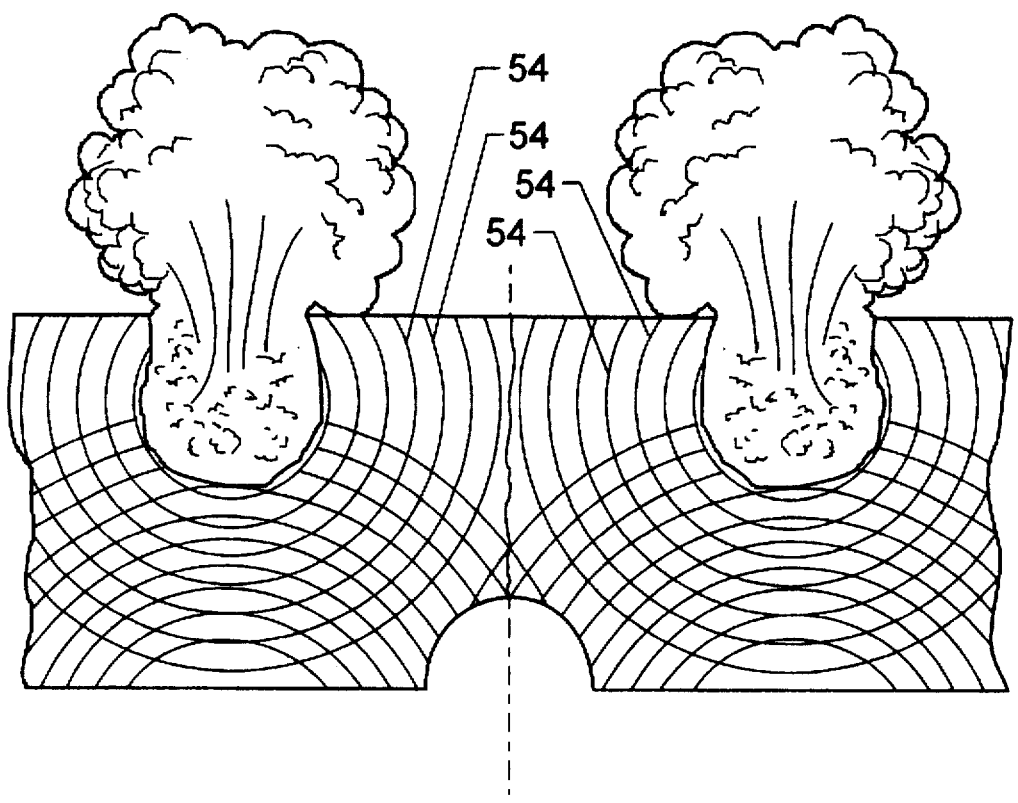
FIG. 9 is a cross sectional view of the present invention after detonation of the explosive elements.

The principle of operation for Augmented Shock Wave Severance is shown in FIGS. 8 and 9.

As shown in FIG. 8, dual detonating cords 10 are bonded into parallel grooves 52 that are cut in the plate 46 on the top surface. The cords 10 are brought together, and the ends of the cords 10 are simultaneously initiated by a detonator. As shown in FIG. 9, the shock waves 54 created by the detonation of the cords 10 are transmitted into the plate 46. These shock waves 54 progress toward the centerline 50 between the cords 10 and the lower surface 48 of the plate 46. Intersecting and reflected waves 54 produce a rarefaction zone on the centerline 50 to fail the plate 46 in tension. No debris is produced through the material severed in the process. The physical configuration of the parameters shown in FIG. 8, (plate material and properties, explosive core load, spacing between the cords, thickness of the plate, and shape and depth of the lower groove, if needed), must be properly established to produce this tensile failure. Not shown is another variable, the attachment of this plate to interfacing aerospace structure to be released. While materials can be severed with a single detonating cord, to achieve the same levels of severance or weakening as the dual-cord configuration, results in the generation of inboard fragments. The fragmentation results from material spalling, caused by the collision of incident and reflected shock waves adjacent to the inboard canopy surface.

In the case of the 0.58 to 0.75-inch thick F-16 trilaminate (stretched acrylic/polyurethane/polycarbonate) specimen, no bottom groove 56 is required. Furthermore, the spacing, 2s, can be set to create a total fracture or to weaken the material. At a spacing of 0.60 inches, complete severance is achieved. At a spacing of 0.80 inches, the material strength is reduced to approximately 25% of its original strength.

In the case of the 2024-T4 aluminum plate, a bottom groove 56 is required to provide a site to trigger the tensile failure. The top grooves 52 in which the explosive cord 10 was potted were cut with a 0.090-inch diameter spherical end mill to a depth of 0.100- inches. The spacing between the cords 10 (2s) was 0.280 inches. The lower groove 56 was again cut with the 0.090-inch spherical end mill, but to a depth of 0.050 inches. The data collected on the pre-test strengths of the material stock without and with the grooves follows:

| 0.190 (3/16-inch) thick stock: | |
| --- | --- |
| No grooves: | 11,244/706 |
| Grooves: | 3,540/208 |
| 0.250 (1/4-inch) thick stock: | |
| No grooves: | 15,968/888 |
| Grooved | 7,192/661 |

Successful severance of a 0.190×6×8-inch plate was accomplished with two 7.65 grains/foot (1.63 grams/meter) lead-sheathed, HMX cyclotetramethylenetetranitramine) explosive cord on its longest dimension.

Successful severance of a 0.250×6×8-inch plate was accomplished with two 10 grains/foot (2.13 grams/meter) lead sheathed, PETN (pentaerythritoltetranitrate) explosive cord on its longest dimensions.

Total severance was achieved. The fracture plane was on the centerline between the grooves and was perpendicular to the surface of the plate.

Many improvements, modifications, and additions will be apparent to the skilled artisan without departing from the spirit and scope of the present invention as described herein and defined in the following claims.

What is claimed is:

1. A method for severing a material, comprising:

selecting a severance site;

cutting two parallel grooves on the upper surface of the material equidistant from the severance site;

placing an explosive cord in each of the two grooves; and simultaneously detonating the two explosive cords.

2. The severance method of claim 1 further comprising cutting a groove on the lower surface of the material parallel to and equidistant from the two grooves on the upper surface of the material.

3. A method for weakening a material, comprising:

selecting a severance site;

cutting two parallel grooves on the upper surface of the material equidistant from the severance site;

placing an explosive cord in each of the two grooves; and simultaneously detonating the two explosive cords.

4. The weakening method of claim 3 further comprising cutting a groove on the lower surface of the material parallel to and equidistant from the two grooves on the upper surface of the material.

* * * * *